United States Patent [19]

Tallafus

[11] Patent Number: 4,792,455

[45] Date of Patent: Dec. 20, 1988

[54] METHOD FOR PRESERVING FRUITS AND VEGETABLES

[76] Inventor: Ottmar Tallafus, Am Himmelreich 14, 6967 Buchen 1, Fed. Rep. of Germany

[21] Appl. No.: 928,867

[22] Filed: Nov. 10, 1986

[30] Foreign Application Priority Data

Nov. 12, 1985 [DE] Fed. Rep. of Germany ....... 3540033

[51] Int. Cl.$^4$ ............................................. A23B 7/144
[52] U.S. Cl. .................................. 426/316; 426/419; 426/615
[58] Field of Search .............. 426/316, 615, 393, 419, 426/312, 316, 118, 418, 270, 637, 324, 320

[56] References Cited

U.S. PATENT DOCUMENTS

| | | | |
|---|---|---|---|
| 976,602 | 11/1910 | Rogerson | 426/320 |
| 1,725,956 | 8/1929 | Cleveland | 426/316 |
| 3,333,967 | 8/1967 | Bury | 426/419 |
| 3,421,836 | 1/1969 | Sundin et al. | 426/418 |
| 3,453,119 | 7/1969 | McGill | 426/320 |
| 3,922,358 | 11/1975 | Follett | 426/316 |
| 3,962,477 | 6/1976 | Dixon | 426/419 |
| 4,224,347 | 9/1980 | Woodruff | 426/106 |
| 4,352,827 | 10/1982 | Fleming et al. | 426/615 |

FOREIGN PATENT DOCUMENTS

7200828 7/1973 Fed. Rep. of Germany ...... 426/312

OTHER PUBLICATIONS

Robitaille et al, 1981 Mushroom Response to Postharvest Hypobaric Storage, J Food Science 46:249.
Sugiyama, 1982, Botulism Hazards from Nonprocessed Foods, Food Technology, Dec., pp. 113-115.
Nichols et al, 1973, Storage of Mushrooms in Pre--Packs: The Effects of Changes in Carbon Dioxide and Oxygen on Quality, J. Sci. Fd. Agr. 24: 1371.
Sugiyama et al., 1975, Growth Potential of Clostridium Botulinum in Fresh Mushrooms Packaged in Semipermeable Plastic Film, Appl. Micro. 30 (6) 964.
Rose et al, 1966, The Condensed Chemical Dictionary, 7th Edition, Reinhold Publishing Corp., New York, p. 701.
Sugiyama, 1978, J. Food Protection 41(5)348.
Burg, 1975, Hypobaric Storage and Transportation of Fresh Fruits and Vegetables in Postharvest Biology and Handling of Fruits and Vegetables, Chapter 14, AVI Publishing Co., Westport, Conn., pp. 172–188.
Besser, 1972, J. Food Sci. 37:820.
Barker, 1960, J. Exp. Botany 11(31)86.
Kader, 1973, J. Amer. Soc. Hort. Sci. 98(5)485.

*Primary Examiner*—Donald E. Czaja
*Assistant Examiner*—Carolyn Paden

[57] ABSTRACT

In a method for preserving foodstuffs including fruits and vegetables, especially geophytes and mushrooms, which are prepared and packaged ready for consumption, the foodstuff is sealed into a container into which pure oxygen is introduced in order to improve preservation of the foodstuffs' appearance and taste during storage.

7 Claims, No Drawings

METHOD FOR PRESERVING FRUITS AND VEGETABLES

BACKGROUND OF THE INVENTION

The invention relates to a method for preserving fruits and vegetables which are prepared and packaged ready for consumption, especially geophytes and mushrooms, by means of gases introduced into the packing container or bag.

Foodstuff has been preserved by conserving gases for some time but the practice has gained rapid importance as the consumers are asking for more fully prepared foodstuff packaged for ready consumption. Such foodstuff includes all kinds of meats, that is, meat products, fish, cheese, pastas and vegetables and also various mixtures of such foodstuff. For the preservation of such foodstuff for a period of at least several days, a mixture of gases has been utilized, preferably carbon dioxide and nitrogen. In order to avoid changes in the appearance of the foodstuff, that is, in order to retain its fresh appearance, in some cases, particularly in connection with fresh meat, oxygen is added to the gas introduced into the packaging container which causes reddening of the myoglobin. The addition of oxygen however shortens the preservation period of the meat even if the package is cooled. For the preservation of foodstuff it is necessary to destroy the microorganisms on or within the foodstuff or at least to prevent their growth. In addition enzymatic or physical and chemical changes in the foodstuff should be prevented. During the conservation period the foodstuff should retain as much as possible its consistency and appearance and also its nutrition values and its flavor.

As far as the destruction, or prevention of growth, of the microorganisms is concerned, special attention must be directed to the aerobic bacteria, that is, bacteria which need oxygen to grow and exist. Those bacterias are therefore generally inhibited by keeping out the oxygen they need to exist, for example, by replacing the oxygen in the surrounding air by gas mixtures which do not provide for the gas exchange needed by those bacterias. This is possible, for example, with pure nitrogen but it is necessary that the package bags or containers contain really only nitrogen. However also carbon-/oxygen compounds, especially carbon dioxide ($CO_2$), are suitable gases and also mixtures of carbon dioxide and nitrogen. Also carbon monoxide would be a suitable gas for the prevention of bacteria growth; it can be used however only in small amounts since it is not without danger for humans. Depending on the goods to be preserved and on the period for which the goods have to be preserved, more or less oxygen may be added to, or may be left with, these gases or gas mixtures. With cooled fresh meat the oxygen content may be up to 70% with about 20% carbon dioxide and 10% nitrogen. Other mixture ratios may be utilized of course but the given limit of 70% oxygen is not exceeded, not even with goods that have to be preserved for only relatively short periods of time; bacteriological protection is obtained herein only with the protective gases nitrogen ($N_2$), carbon dioxide ($CO_2$) and carbon monoxide (CO).

Before the goods to be preserved are surrounded by such gases they may be cooled or frozen. Freezing to a temperature of substantially below 0° C. however is not suitable for all types of foods. Vegetables and fruits, for example, may generally not be cooled to below 0° C. An exception are vegetables which are cooked before consumption.

For the preparation of salads, only fresh foods may be used, that is, the various kinds of vegetables: escarole, radicchio, cabbage, romaine, herbs, sweet corn, radishes, celery roots, carrots, potatoes, onions and so on. Recently however also vegetables are prepackaged as salads and salad mixtures ready for consumption. Those salads too are packaged under a protective cover gas and since they are quite easily spoiled they are packaged with nitrogen or nitrogen-carbon dioxide gas mixtures. This is also true for mushrooms which recently also appear on the market more frequently. But in spite of refrigeration, which is used in addition to the packaging under a protective gas, these sensitive vegetables will generally nevertheless suffer losses in quality as far as color and taste are concerned already after a relatively short storage time of only a few days.

It is the object of the present invention to provide a method which avoids the relatively rapid losses in quality of such sensitive foods.

SUMMARY OF THE INVENTION

In a method for preserving foodstuffs including fruits and vegetables, especially geophytes and mushrooms, which are prepared and packaged ready for consumption, the foodstuff is sealed into a container into which pure oxygen is introduced in order to improve preservation of the foodstuffs' appearance and taste during storage.

The process may be performed under refrigeration or, if the foodstuff is suitable for freezing, deepcooled oxygen may be utilized to cause flash freezing of the foodstuff while it is packaged.

It is well known that especially aerobic bacteria are responsible for the spoiling of delicate foodstuff and it has therefore always been tried to remove the means for those bacteria to continue to live by removal of the oxygen. It has been found however that introduction of pure oxygen into the packaging containers or bags which receive the delicate foodstuff provides for excellent gas protection which is clearly superior to the protection afforded by the usual protective gas mixtures, that is, a protection which inhibits growth of the aerobic bacteria but furthermore avoids the losses in food quality. How this result is achieved is not quite clarified. It appears however that even aerobic bacteria do not thrive in a pure oxygen atmosphere, that is, that pure oxygen is of a toxic nature for the aerobic bacteria, or it may be possible that plants which, after harvesting and after washing and cutting, are treated with pure oxygen by $O_2$ hyperventilation will still generate an amount of carbon/oxygen compounds so that, together with the oxygen introduced into the packaging container, an optimum protective gas atmosphere is formed. A bacteriainhibiting surface film may also be formed by the water which remains on the foodstuff surfaces and into which $CO_2$ may be dissolved and forms a protective acid film.

In addition to preventing a reduction in quality, that is, a value reduction by changes in color and taste, the bags in which the foodstuff is preserved and which consist of polyethylene do not bulge but, on the contrary, they contract during the storage period, that is, the gas volume contained therein becomes smaller. The package so obtained is a product which provides for fresh appearance of the foods contained therein. Also the consumer prefers a package which is not bulged.

Furthermore the taste of the foodstuff does not suffer during storage and can practically not be distinguished from that of the respective fresh foods.

As mentioned before the foods considered for packaging in connection with the invention are mainly geophytes, that is, vegetables which grow in the ground such as onions, potatoes, carrots, celery roots, radishes, etc., but also mushrooms and cabbage, etc.

In order to prevent spoilage of the sensitive foods they have to be maintained refrigerated also while they are packaged. Also oxygen should be introduced into the packaging container only when the goods to be packaged are cooled to a temperature of 1° C. to 5° C. The goods so packaged should be stored at a temperature of 1° C. to 8° C.

During the introduction of the oxygen into the packaging container the goods may be cooled by oxygen which has a temperature of less than 0° C. The temperature may even be so low that it is utilized to provide flash freezing if the fruits or vegetables in question are suitable for freezing.

The method according to the invention will become more readily apparent on the basis of a number of packaging examples which are described as follows:

EXAMPLE 1

250 g of a vegetable mixture were packaged in a bag, the mixture consisting of 40 g kohlrabi, 60 g celeriac, 40 g leek, 30 g savory, 10 g parsley, 40 g potatoes, 10 g peas, 20 g green beans, all cut into pieces.

Pure oxygen was introduced into the bag. After a storage time of 4 days without refrigeration, the appearance of the vegetables in the bag was practically unchanged. The vegetables appeared to be totally fresh after this storage period. Also the taste of the mixture after storage was practically undistinguishable from that of fresh vegetables.

EXAMPLE 2

Mixtures as given above were packaged with highly refrigerated oxygen and then stored refrigerated at 3° C. to 5° C. for periods of 2 to 3 weeks. No change in appearance or taste could be detected in the test samples.

EXAMPLE 3

The method according to the invention may also be utilized for lettuce or vegetable mixtures which include geophytes. Into a 250 g bag there was introduced: 10 g carrots cut into sticks, 80 g cabbage cut to strings, 80 g escarole, 20 g radicchio, 20 g iceburg lettuce, 5 g sweet corn, 5 g radishes and 30 g romaine.

Again pure oxygen was introduced into the bag. After a storage period of 4 days without refrigeration no change of the mixture could be detected. The lettuce still appeared completely fresh. Also the taste of the salad was not distinguishable from freshly prepared salad.

EXAMPLE 4

The same mixture as given in Example 3 was packaged using deep-cooled oxygen and was stored at a temperature of 3° C. to 5° C. over a period of 3 weeks. Here again like in Example 2 no change of the salad mixture either in appearance or in taste could be detected even after the relatively long storage period.

What is claimed is:

1. A method for preserving fresh fruits and vegetables, especially geophytes and mushrooms, comprising:- preparing said fresh fruits and vegetables so as to be ready for consumption, then refrigerating and packaging the fruits and vegetables into a flexible wall container and then introducing pure oxygen into said container in such a manner that essentially no gas other than oxygen is present therein and then sealing the container with the fruits or vegetables contained therein in an oxygen atmosphere under atmospheric pressure.

2. A method according to claim 1, wherein before packaging, the fruits and vegetables are cooled to a temperature of 1° C. to 5° C.

3. A method acording to claim 1, wherein the oxygen is introduced into the container at a temperature of below 0° C.

4. A method according to claim 1, wherein the fruits and vegetables so packaged are stored at a temperature of 1° C. to 8° C.

5. A method according to claim 2, wherein the fruits and vegetables so packaged are stored at a temperature of 1° C. to 8° C.

6. A method according to claim 3, wherein the fruits and vegetables so packaged stored at a temperature of 1° C. to 8° C.

7. A method according to claim 1, wherein, for fruits and vegetables suitable for flash freezing, deep-cooled oxygen is introduced into the container to provide the flash freezing effect.

* * * * *